Figure 1:
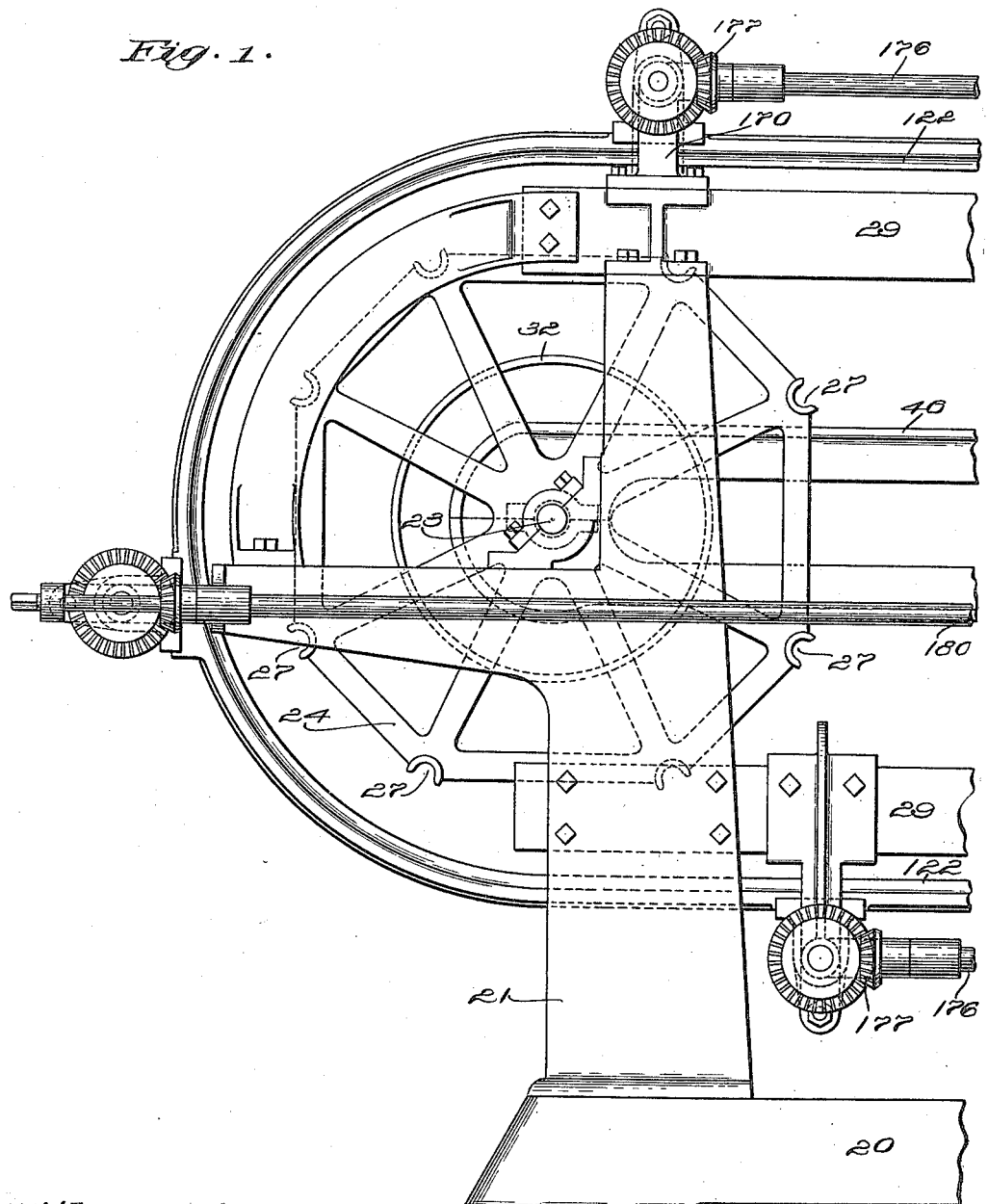

E. W. LABOMBARDE.
PAPER BOX MACHINE.
APPLICATION FILED FEB. 24, 1909.

1,161,227.

Patented Nov. 23, 1915.
9 SHEETS—SHEET 1.

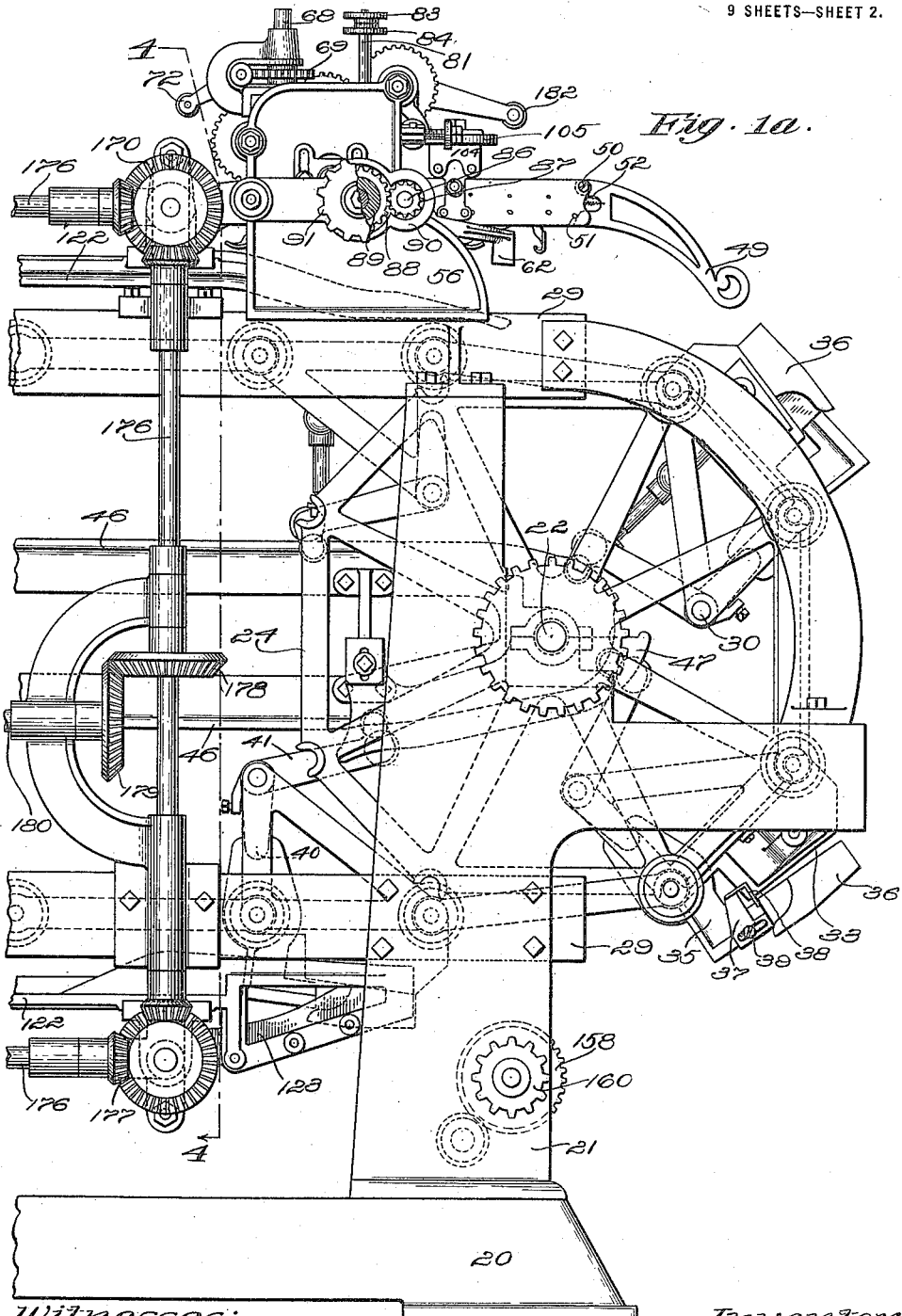

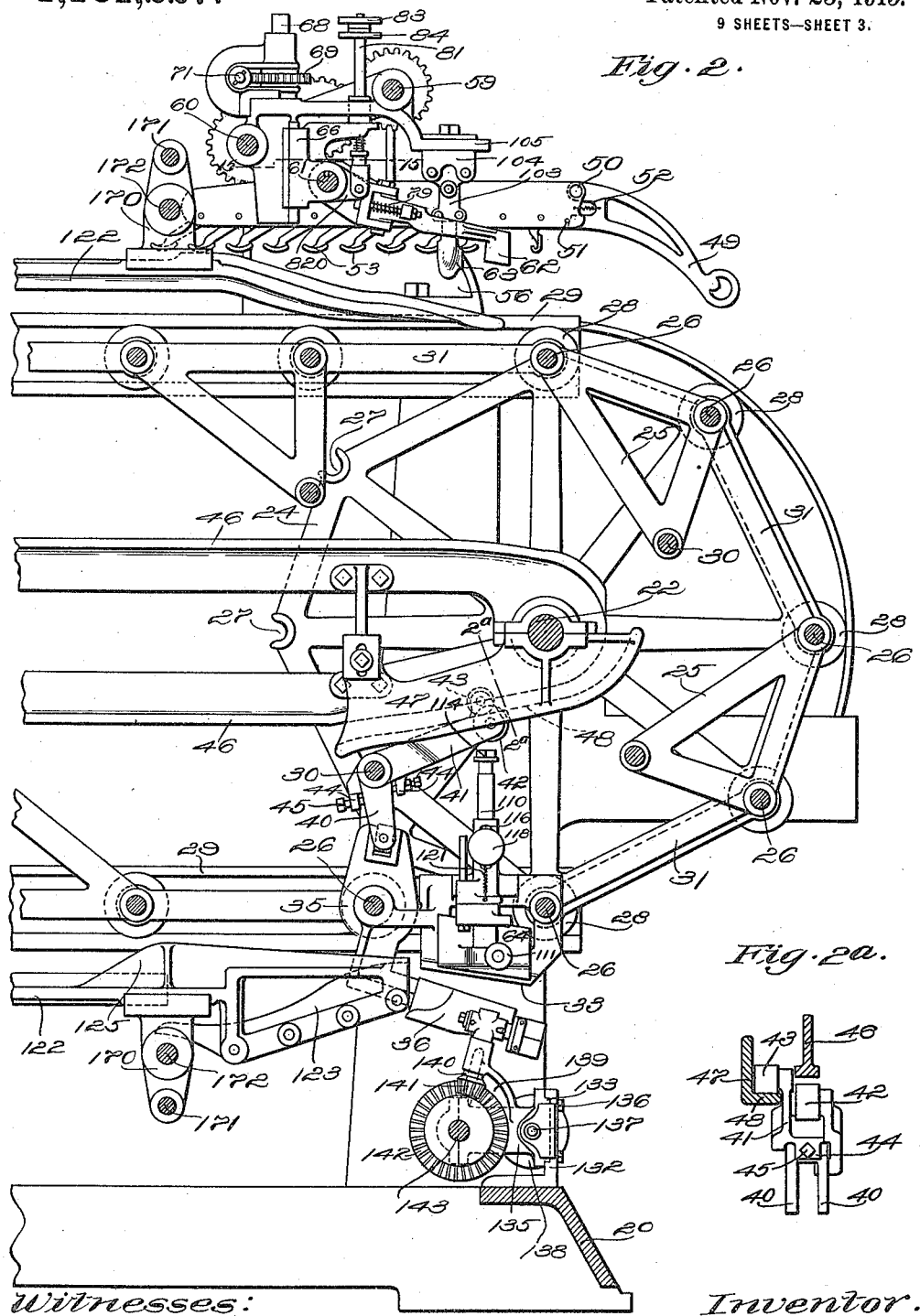

E. W. LABOMBARDE.
PAPER BOX MACHINE.
APPLICATION FILED FEB. 24, 1909.

1,161,227.

Patented Nov. 23, 1915.
9 SHEETS—SHEET 5.

E. W. LABOMBARDE.
PAPER BOX MACHINE.
APPLICATION FILED FEB. 24, 1909.
1,161,227.
Patented Nov. 23, 1915.
9 SHEETS—SHEET 6.
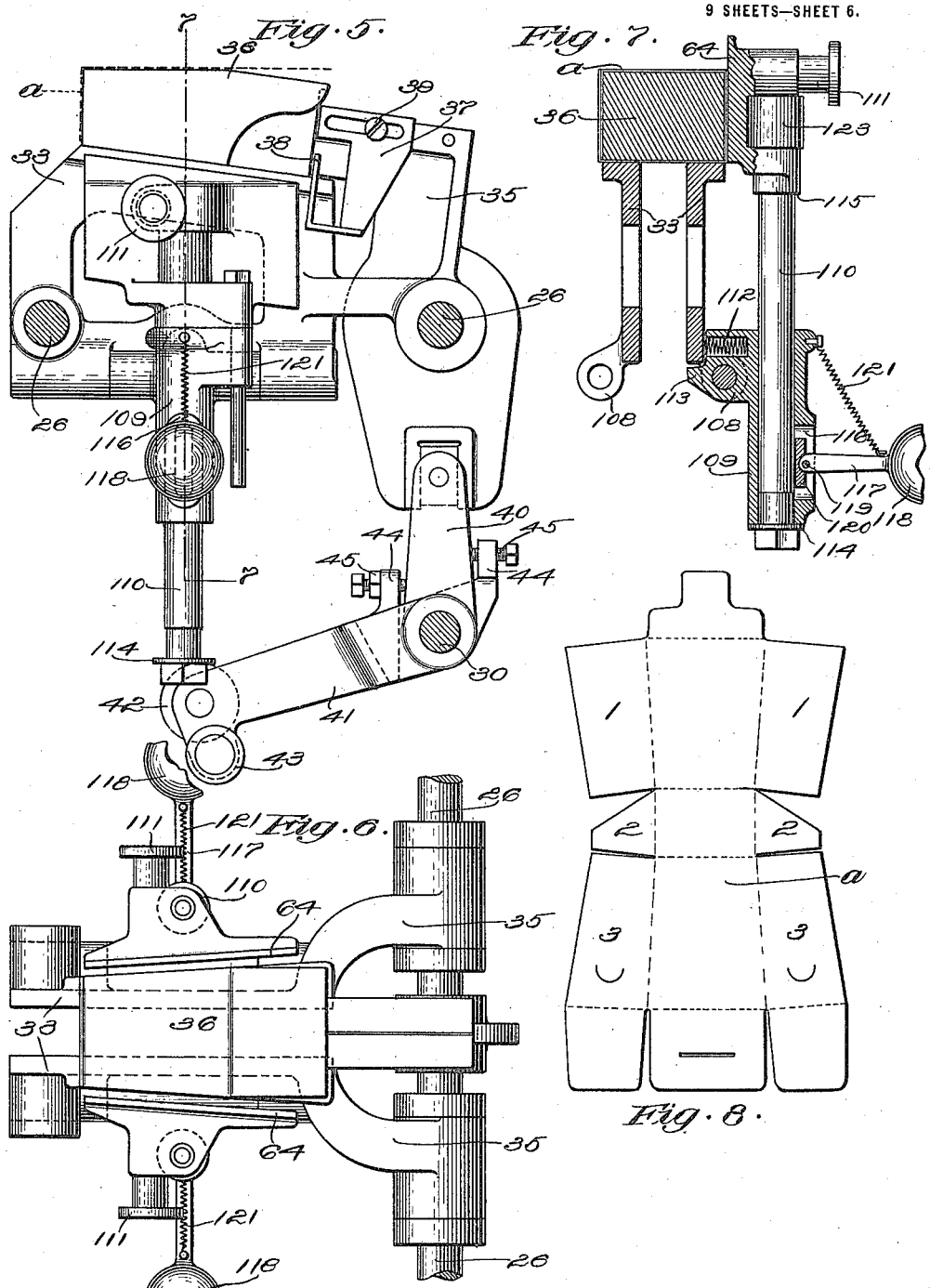

E. W. LABOMBARDE.
PAPER BOX MACHINE.
APPLICATION FILED FEB. 24, 1909.
1,161,227.
Patented Nov. 23, 1915.
9 SHEETS—SHEET 7.
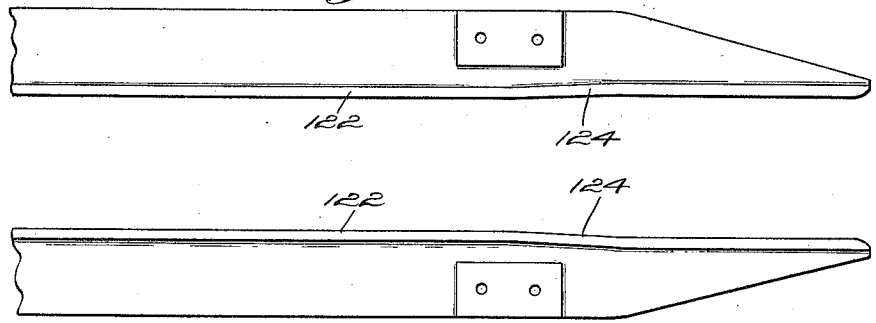
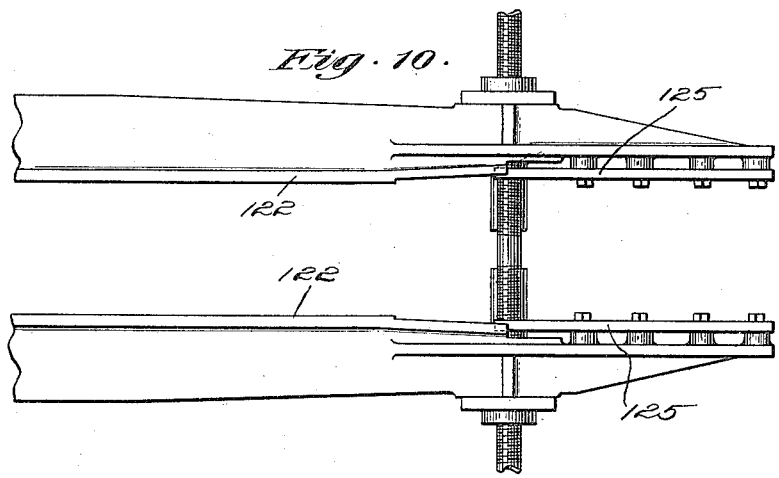
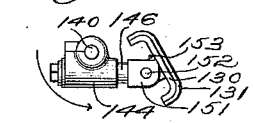
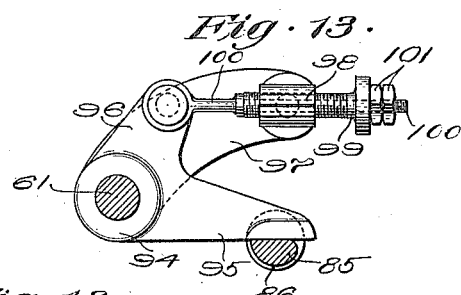
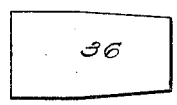
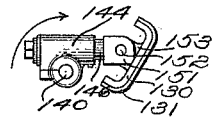
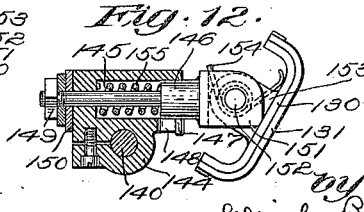
Witnesses:
F. R. Roulstone
P. W. Pezzetti
Inventor:
E. W. Labombarde
by
Wright Brown Quinby May
Attys E. W. LABOMBARDE.
PAPER BOX MACHINE.
APPLICATION FILED FEB. 24, 1909.
1,161,227.
Patented Nov. 23, 1915.
9 SHEETS—SHEET 8.
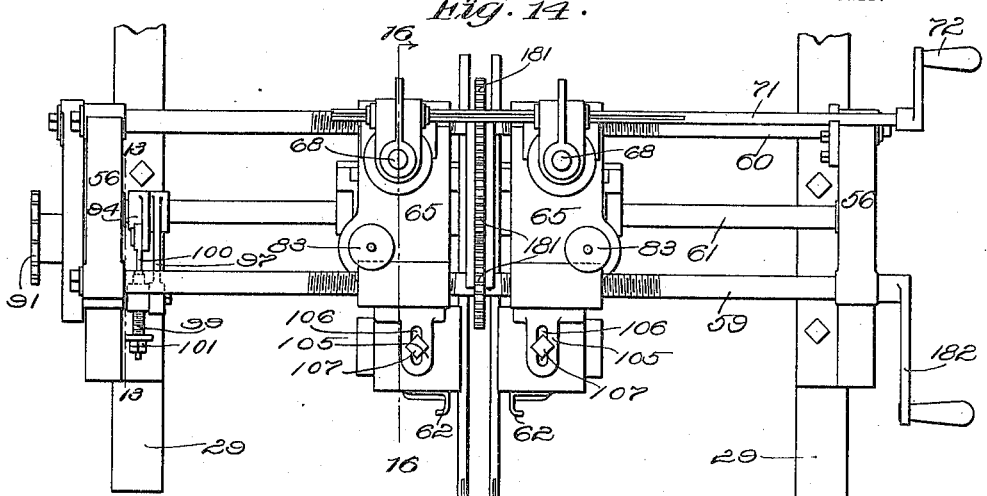
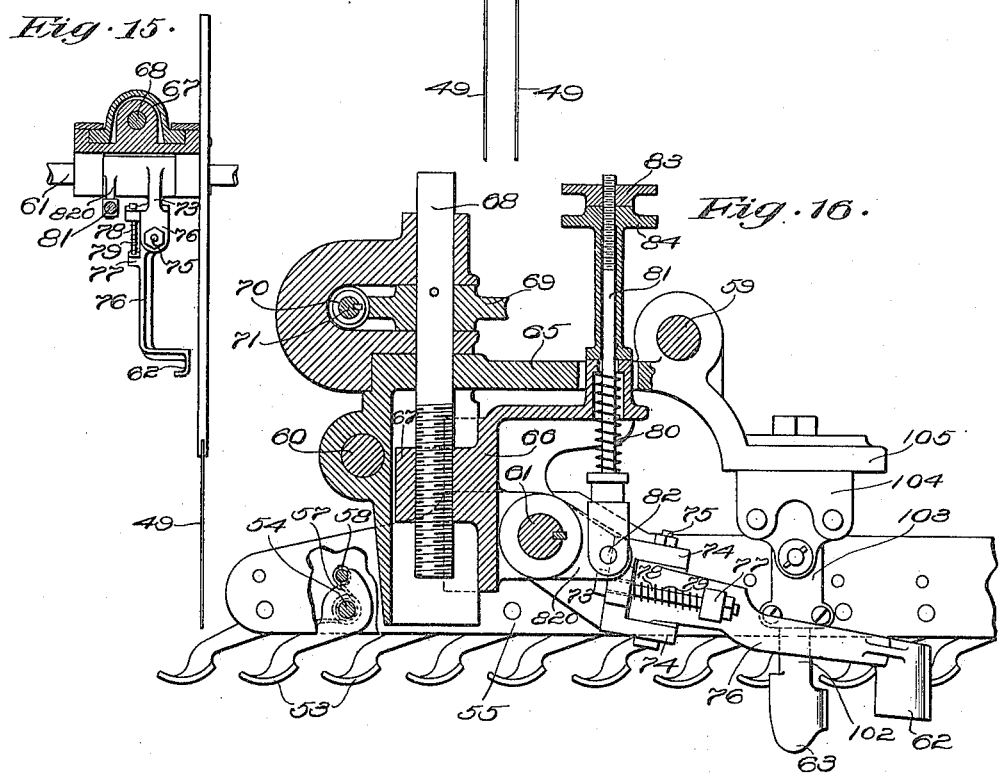
Witnesses:
F. R. Roulstone
P. W. Pezzetti
Inventor:
E. W. Labombarde
by Wright Brown Quinby & May
Attys.

E. W. LABOMBARDE.
PAPER BOX MACHINE.
APPLICATION FILED FEB. 24, 1909.

1,161,227.

Patented Nov. 23, 1915.
9 SHEETS—SHEET 9.

UNITED STATES PATENT OFFICE.

ELIE W. LABOMBARDE, OF NASHUA, NEW HAMPSHIRE.

PAPER-BOX MACHINE.

1,161,227.  Specification of Letters Patent.  Patented Nov. 23, 1915.

Application filed February 24, 1909. Serial No. 479,827.

*To all whom it may concern:*

Be it known that I, ELIE W. LABOMBARDE, of Nashua, in the county of Hillsboro and State of New Hampshire, have invented certain new and useful Improvements in Paper-Box Machines, of which the following is a specification.

This invention relates to machines for making boxes, particularly of the type generally referred to as ice-cream boxes, the same being formed by suitably bending or folding scored blanks of paper or straw board.

One of the objects of my invention is to provide a machine the principal forming members of which are continuously movable, taking the blanks in one position, or at one end of the machine, folding the flaps thereof and holding the last turned flaps for a sufficient length of time to cause the glue or cement to finally secure the flaps, all of this being done while the blanks are moving continuously in the same direction whereby a machine constructed according to my invention may turn out the finished boxes at a maximum rate of speed and with a minimum expenditure of power.

Other objects of the invention are to provide a machine of this character which shall be simple and durable, all as will be more fully hereinafter described.

My invention consists in a machine for folding blanks into box form, said machine comprising an endless series of carriers each having a former or mandrel, means whereby said endless series is moved continuously in one direction, and folders which coöperate with the formers to shape the blanks around the formers and hold them long enough for an adhesive material to set.

My invention further consists in various combinations and constructions of parts of the machine all as will be hereinafter described and then pointed out in the claims.

Figure 3:
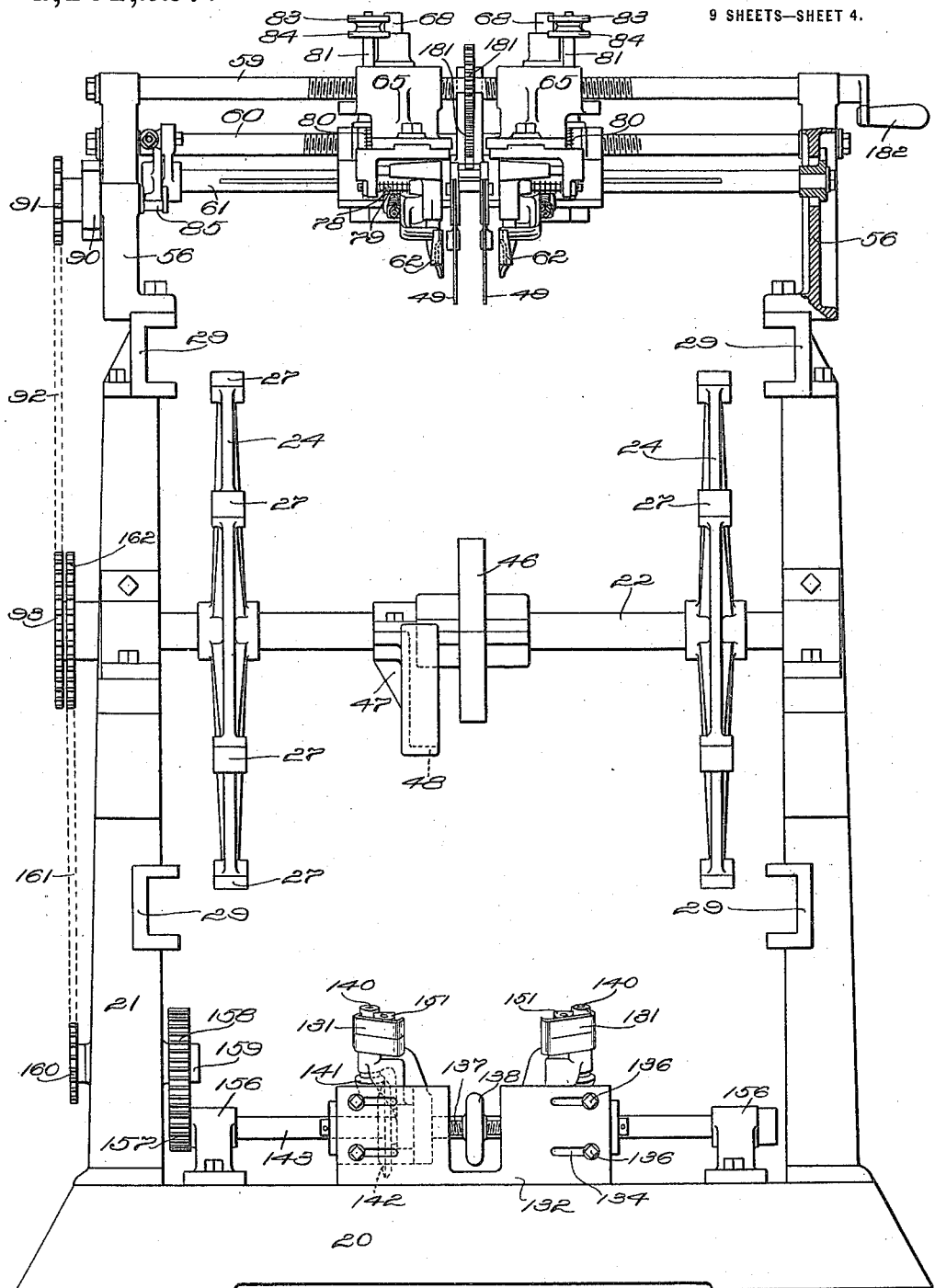
Figure 4:
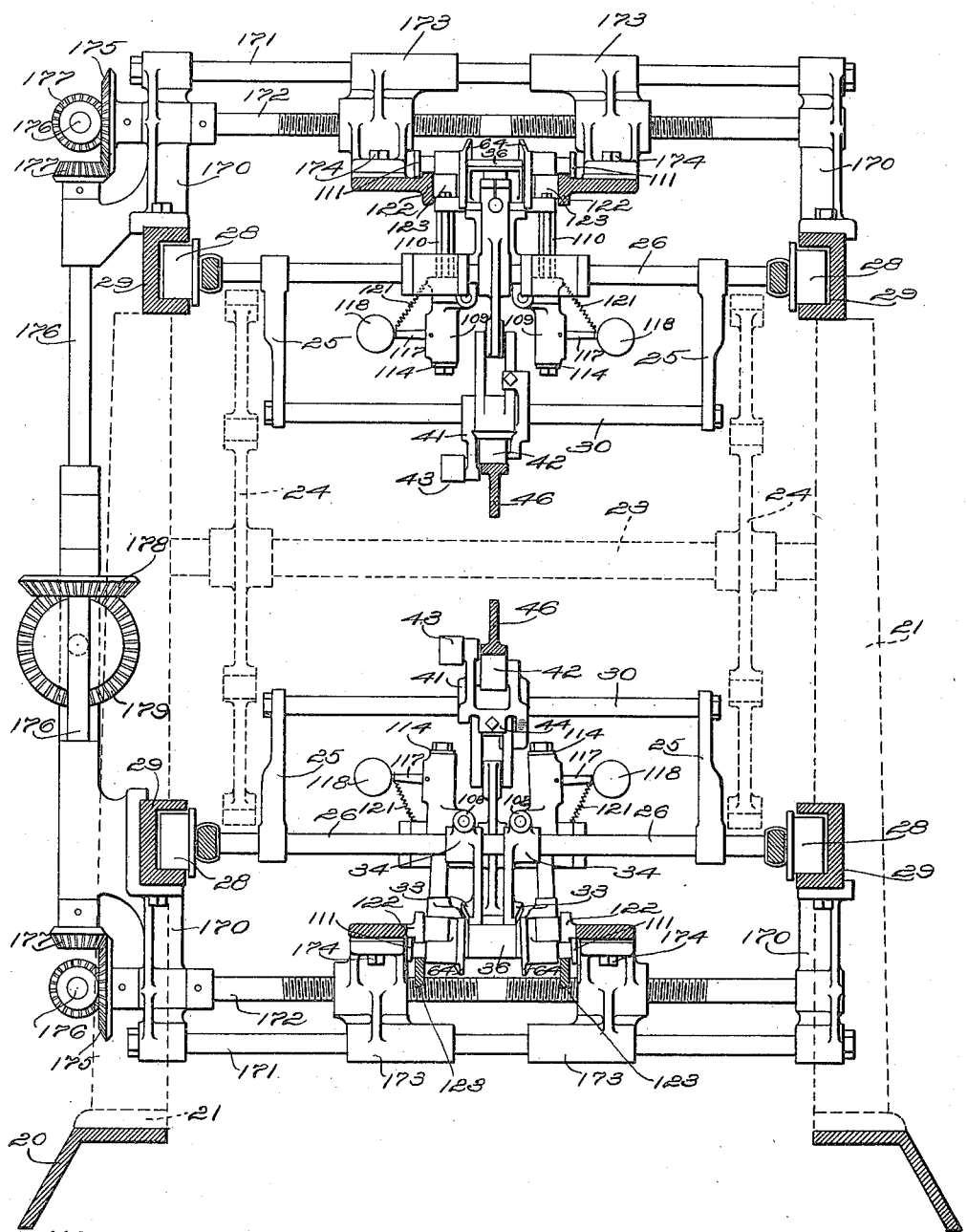
Figure 17:
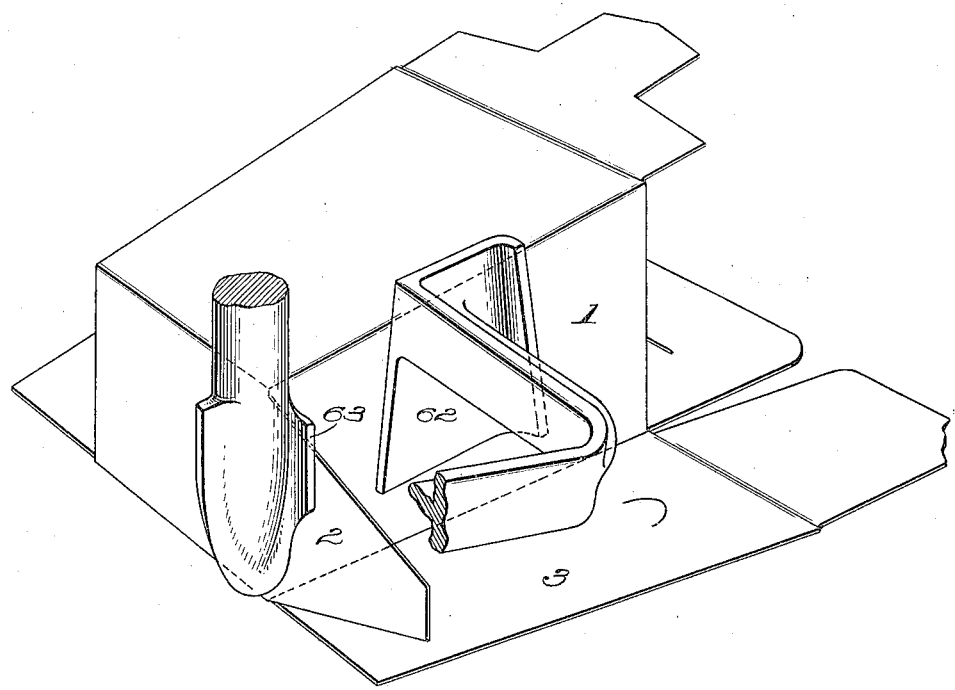

Of the accompanying drawings in which similar reference characters indicating the same or similar parts: Figure 1 is a side elevation of one end portion of a machine embodying my present improvements. Fig. 1ᵃ is a similar view of the other end portion of the machine. Figs. 1 and 1ᵃ are in fact to be considered as one figure broken out at the center to reduce its length. Fig. 2 is a view similar to Fig. 1ᵃ, but with the near side of the frame removed and parts being in section. Fig. 2ᵃ represents a detail section on line 2ᵃ 2ᵃ of Fig. 2. Fig. 3 is an end view looking from the right of Fig. 2, but with the traveling series of carriers removed. Fig. 4 represents a section on line 4 4 of Fig. 1ᵃ. Fig. 5 is a detail side elevation, on a larger scale, of one of the formers and its coöperating mechanism. Fig. 6 represents a plan view of the parts shown in Fig. 5. Fig. 7 represents a section on line 7—7 of Fig. 5. Fig. 8 is a plan view of a blank which is to be formed into a tapering square box by the machine illustrated and described. Fig. 9 is a detail plan view of the upper or entering end of the cam tracks which actuate the pressers. Fig. 10 is a similar view of the lower or discharge end of the same tracks. Fig. 11 is a detail view of the wipers or knockers-off which throw the completed box off from each former, as it passes between them. Fig. 12 is a view similar to a portion of Fig. 11, but on a larger scale and partly in section. Fig. 13 is a detail view on section line 13—13 of Fig. 14. Fig. 14 is a plan view of the head of the machine shown at the top of Fig. 1ᵃ. Fig. 15 is a detail view, partly in horizontal section, of one of the side folders. Fig. 16 represents a section on line 16—16 of Fig. 14, but on a larger scale. Fig. 17 is a perspective view of a blank which is partially folded, said figure showing also the two side folders which are located at one side of the path movement of the formers.

A preliminary outline of the construction and operation of the machine will first be given to facilitate an understanding of the detailed description given later.

The machine as a whole is indicated by placing Figs. 1 and 1ᵃ together, said machine comprising front and rear sprocket wheels mounted on shafts 22 and 23, said sprocket wheels supporting an endless series of carriers comprising triangular end pieces 25 connected by rods or shafts as shown in Fig. 2, said carriers being connected by links 31 to form an endless series. Each carrier supports a base member 33 against which a former 36 moves when a blank is taken, so that the blank is clamped after which it is moved up under the blades 49 to double the blank over the end of the former where holding fingers 53 are located to hold the folded over portion down on the former. Side flap folders 62 first press the flaps 1 of the blank down as shown in Fig. 17, then folders 63 turn in the end flaps 2, these folders 62 and 63 being supported at the front upper part of the machine, and then folders 64 (Figs. 2, 5 and 7) move upward and inward to turn the flaps 3 of the blank up over and against the flaps 2 and 1, the said folders 64 being supported by the carriers so that they travel with the formers. When the formers open away from the bases underneath the front part of the machine shown in Fig. 2, revolving wipers shown in Fig. 11 throw the boxes off from the formers. A detailed description follows:

The frame of the machine is shown as comprising a base 20 having uprights 21 which support the operative part of the machine. For convenience of description the end of the machine indicated at the right of Fig. 1ª will be referred to as the front of the machine and the portion at the left of Fig. 1 as the rear. Mounted in bearings carried by the uprights 21 are a front shaft 22 and a rear shaft 23, and secured on each of said shafts is a pair of sprocket wheels 24 on which are mounted the carriers which support the formers and clamps, said carriers being connected to form an endless series.

As shown in Figs. 1ª, 2 and 4, each carrier comprises two triangular shaped end frames connected by three rods or shafts. The end frames are indicated at 25, and the outer rods 26 which pass through the frames 25 are adapted to engage the recesses 27 of the sprocket wheels, said outer rods having anti-friction rolls 28 which run in guides or channels 29 supported by the frame of the machine. There is a guide or channel 29 on each side of the machine as shown in Fig. 4, portions being omitted at the sides of the sprockets at the front and rear because the carriers are then supported by said sprockets. It is sufficient for the guides or channels to bridge the horizontal spaces between the peripheries of the front and rear sprockets. Mounted in the inner angular portions of the end frames 25 of each carrier is a rock shaft 30 the function of which will be hereinafter described. The rods 26 of each carrier are connected by links 31 to the similar rods of the next carriers so as to constitute an endless series of carriers mounted upon the sprocket wheels 24 and supported by the guides 29. Power may be applied by any suitable means such as by a belt (not shown), applied to a pulley 32 (see Fig. 1), said pulley driving the rear shaft 23 and through the endless series of carriers and other connections or gearing hereinafter described, driving all of the other parts of the machine.

Each of the carriers, which, as has been stated, comprises two triangular end frames connected by two rods and a shaft at the points of the triangle, is provided with a mandrel or former and with means coöperating therewith to insure that a blank such as indicated in Fig. 8 will be grasped and folded and held under pressure during the time that it travels from the front of the machine which is at the right of Fig 1ª, over the top of the machine rearwardly and then returning underneath to a point below the front portion of the machine where it is discharged, it being understood of course, that each blank has flap portions coated with suitable glue or cement before it is grasped for folding. In Fig. 1 none of the carriers and formers are shown, it being sufficient to illustrate three of them in Fig. 1ª, and one of them in Fig. 2. As shown by comparing Figs. 1ª and 4, each pair of rods 26 has mounted thereon a base against which the former presently described clamps one end of a blank. For convenience of adjustment to enable the machine to be adapted to fold boxes of different sizes, the said base comprises two members as shown in Figs. 4, 6 and 7, said two members being indicated at 33. The faces of the base members 33 which co-act with the former 36 are flat, and the two members are shown as having hub portions 34 which are adapted to be clamped upon the rods 26 in any position of lateral adjustment that may be required according to the size of blank to be folded, it being understood of course, that different sizes of formers will be used whenever the width of the base is varied by adjusting the hubs 34 apart from or toward each other on the rods 26. Mounted on the rearmost rod 26 of each pair is an arm 35 having a former 36 which in practice is removably connected to said arm so that formers of different sizes can be substituted for each other. Adjustably mounted on arm 35 is a plate 37 (see Fig. 1ª), said plate bridging arm 35 and extending down on each side and having an upturned gage lip 38 on each side of the arm. The plate 37 is slotted and adjusting screws 39 are passed through the slots into arm 35, so that the gage can be adjusted with the lips 38 more or less distant from the end of the former 36 according to the size of blank to be folded. The blanks $a$ may be supplied to the machine by hand or by a suitable feeder mechanism. The point where they are supplied is when a carrier reaches the position shown at the lower right hand end of Fig. 1ª, the former 36 being then separated from the base 33 by a slight distance to permit the blank to be introduced between the former and the base to an extent determined by the gage lip 38.

I will now describe the means whereby each former, after the blank is introduced, as described, is rocked so as to grip one end of the blank against its coöperating base. As best shown in Figs. 2 and 5 the arm 35 of the former is forked at its inner end and receives a wear block or pin projecting from an arm 40 mounted on the rock shaft 30 so that when said rock shaft is actuated, the former 36 will be caused to approach and recede from the base member of its carrier. The rock shaft 30 is also provided with an arm 41 the latter having two rolls 42 and 43. These rolls, 42 and 43, run on guides or tracks as presently described to positively actuate the former arms 35. In order to adjust the operative position of the arm 35, relatively to the actuating rock shaft so that the former may press the blank with proper force against a base, the arm 41 of the rock shaft 30 is provided with two lugs 44 in which are mounted set screws 45 which set screws are set up against the arm 40. By unscrewing one of the said screws and turning in the other one the angular position of the arm 40 relatively to the arm 41 may be secured for the purpose which has just been described.

The cam track or guide along the outer surface or edge of which the roll 42 runs to hold the former gripping the blank against the base, is indicated at 46 and is shown in Figs. 1, 1ª, 2, 3 and 4. It comprises two web castings supported at their ends on the shafts 22 and 23. As shown in Fig. 2, and by dotted lines in Fig. 1ª, the said cam track 46 is cut away or reduced in height at the front end of the machine and for a slight distance underneath and rearward so that when the roll 42 reaches the lower portion of said cam track (and by the lower portion, I mean relatively to the longitudinal center of the machine) the former will be permitted to drop away from the co-acting base as shown in Fig. 2. Since weight alone of the parts may not always be sufficient to cause the former to assume the position just described, I have provided means for positively actuating the arm 41 to cause the former to open or drop, after the roll 42 reaches the lower or cut away portion of the cam track. The means which I have illustrated for this purpose comprises a casting 47 suitably secured to the web casting of the cam track 46, and also supported on the shaft 22, said casting having a cam rib 48 as indicated in Fig. 2ª and by dotted lines in Figs. 2 and 3. The roll 43 carried by the arm 41 coöperates with said cam rib 48 to raise the arm 41, and consequently cause the former 36 to positively open and remain open during the travel of each carrier from a position just underneath the front end of the machine until it passes the position where the new blank is supplied. As will be hereinafter described, the formed box will be ejected from the former just as the latter reaches the position shown in Fig. 2. The blanks are fed in or supplied to the machine with that portion shown at the bottom of Fig. 8 entering first. As the blanks are previously scored, the upper portion of each blank falls outward somewhat over the end of the former 36 as it travels upward. As shown in Figs. 1ª, 2 and 14, the outwardly curving or bending free portion of the blank travels under a pair of blades 49 which are supported above the machine in a yielding manner, said blades being pivotally supported at 50 and held against stops 51 by springs 52. As the former passes under the blades 49 the box blank is turned over the end and along the then top of the former and is held in that position with the side flaps projecting out horizontally.

In Fig. 8 the flaps of the blanks which are folded in by this machine are indicated at 1, 2 and 3, this being the order in which the flaps are turned as will be presently described. The portion of the blank between the side flaps will be referred to herein as the body or central portion. It is this body or central portion which is turned over the former by the blades 49. In order that this same portion shall be held against the former during the time that the side flap turners or folders are operated, as presently described, I employ a row of yielding pads or fingers 53, (see Figs. 2 and 16) said pads or fingers being in the path of travel of the blank rearward or behind the blades 49. Said fingers 53 are pivotally mounted on pins 54 carried by a frame 55 which frame is in turn supported by the bracket frame 56 supported upon the main frame above the upper channels 29. The bracket frame 56 comprises two members one on each side of the machine as shown in Fig. 3, said members 56 being connected by rods or shafts as hereinafter described, which rods or shafts support the frame 55 for the pads 53. Each pad 53 is pressed yieldingly downward by a spring 57, a stop pin 58 being employed to limit the lower position of said pad or finger.

For convenience of description, I refer to the members 59 and 60 which connect the brackets 56, as rods, although they are screw threaded and are adapted to be rotated as will be described hereinafter, and to the member 61 as a rock shaft. As shown in Figs. 2, 3, 14 and 16, the three members 59, 60 and 61, support the flap folders excepting those which are mounted on and move with the carriers. After each former, with a blank turned over it, has passed under the blades 49, and under the first of the series of yielding fingers 53, the flaps 1 are turned downward by folders 62, (one on each side of the path of movement of the former); then the small flaps 2 are folded inward over portions of the flaps 1 by folders 63; and then the flaps 3 which have been previously gummed are folded upward over the flaps 1 and 2 by other folders 64 which are supported by and which move with the carriers, and which last mentioned folders I refer to as doors or pressers 64, since they act to close down the final flaps 3 against the other flaps and toward the sides of the former and hold them pressed during the travel of the carriers to the rear of the machine and forward again to the point of discharge.

I shall now describe the construction of and means for operating the folders 62: As best shown in Figs. 14 and 16, the rods 59 and 60 support two block frames 65, these two frames being duplicates of each other and mounted on opposite sides of the longitudinal center of the machine, and adjustable toward and from each other to vary the space between them for a purpose which will be hereinafter described. Within each frame 65 is mounted, on suitable vertical ways, a casting 66 having a bearing for the rock shaft 61 and having also a lug 67 having a vertical threaded opening for a screw 68 on which is pinned a worm wheel 69 engaged by a worm 70 splined on shaft 71 having a crank handle 72 at one end. By means of the crank handle 72 the shaft 71 may be rotated so that the two worms 70 thereof will actuate the worm wheels 69 and their screw shafts 68 so as to vertically adjust the height of the castings 66 and the rock shaft 61. Within each block frame 65 an arm 73 is mounted on the rock shaft 61 so that when said rock shaft is oscillated the said arm will be raised and lowered, said arm projecting from a hub or sleeve splined on the rock shaft. The arm 73 is provided with lugs 74 having a substantially vertical pivot 75, on which pivot is mounted an arm 76 carrying at its outer end a folder 62. In order that the folder 62 may be yieldingly pressed inward toward the longitudinal center of the machine and toward the formers as they pass, the arm 76 is provided with a lug 77 (Figs. 15 and 16) through which and a lug projecting from the arm 73 a pin 78 passes, said pin being surrounded by a coil spring 79 which bears at its ends against the lug 77 and the lug projecting from the arm 73, the arrangement being such that the said spring 79 tends to swing the arm 76 and folder 62 on the pivot 75 so as to press the folder 62 inwardly as described. The folders 62 and their arms are yieldingly pressed downward by springs, one of which is shown at 80 in Fig. 16, said spring being coiled around a rod 81 pivotally connected at 82 to an arm 820 projecting from the hub of arm 73 and extending up through the block frame 65 and threaded at its upper end and having two nuts 83 and 84, the former being a jam nut and the latter being elongated in the form of a sleeve and bearing on the top of the casting 66. By means of said nuts 83 and 84, the normal position of the rock shaft and height of the folder 62 may be adjusted in an obvious manner. The rock shaft is actuated against the pressure of the springs 80 by a cam 85 (see Figs. 3, 13 and 14), said cam being carried by a stud shaft 86 mounted in one of the bracket frames 56 and having a pinion 87 meshing with a gear 88 (see Fig. 1ª) carried by a sleeve 89 mounted loosely on a stud projecting from the frame 56. The gear and pinion are inclosed by a casing 90. The sleeve 89 also has a sprocket 91 actuated by a chain 92 which in turn is driven by a sprocket 93 on the shaft 22.

As shown in Fig. 13, the cam 85 does not act directly on the rock shaft 61, but through the medium of adjustable connections as follows: Mounted loosely on the shaft 61 is a sleeve 94 having two arms one of which, 95, rests on the cam 85, while the other arm 96, has an adjustable connection with an arm 97 which is rigidly connected with the shaft 61. Pivotally carried by the outer end of the arm 97 is an internally threaded sleeve 98 which sleeve receives an externally threaded sleeve 99. Through the sleeve 99 a rod 100 passes, said rod being pivotally connected with the arm 96 and being threaded at its outer end and having two nuts 101 thereon. By adjusting the sleeve 99 in the sleeve 98 and correspondingly adjusting the nuts 101 so as to bring the rod 100 to its proper relationship longitudinally of the sleeve 99, the distance between the pivotal point of the sleeve 98 on the arm 97 and the pivotal point on the rod 100 of the arm 96 may be varied to obtain the correct relationship of the parts. I do not however, consider this adjustment as essential, since good results may be obtained by mounting the arm 95 rigidly on the rock shaft 61, and not providing for any adjustment.

The time of the operation of the cam 85 is such that when a former with a blank thereon reaches a position between the two folders 62, the said two folders are allowed by the cam to descend under the influence of the two springs 80 so as to fold the two flaps 1 down against the sides of the former, this occurring before the former and blank reaches a position between the folders 63. The flaps 1 are pressed downwardly and inwardly with a yielding pressure, the yielding inward pressure being effected by the springs 79. As the former, with the blank thereon as described, passes between the folders 63, the flaps 2 are turned inward against the outer surfaces of the flaps 1, the position of the former and its blank relatively to the folders at this time being indicated in Fig. 17. The said folders 63 simply comprise flanges projecting from the lower ends of vertical shafts 102, one at each side of the path of movement of the former and blank, the said shaft 102 being adjustably secured in a socket 103 (Figs. 3, 14 and 16) which socket is carried by a block 104 adjustably supported by a bracket 105 projecting from the frame 65. The adjustment of the block 104 relatively to the bracket 105 is effected by means of a slot 106 through which a screw stud 107 passes into the block 104.

The next operation of the machine is to fold the flaps 3, which have been previously gummed, up over the flaps 2 and 1. The folders which perform this operation, and which I refer to as doors or pressers, travel with the formers constantly, two of said doors, one on each side of each former, being mounted on the carriers of the latter. They are best illustrated in Figs. 5, 6 and 7 and they are shown as constructed and operating as follows: Pivotally connected to lugs 108 of the base members 33 are bearing blocks 109 (one on each side). Each bearing block is formed with a substantially vertical opening for the rod or stem 110 on the upper end of which is mounted a door or presser 64, the latter having a horizontal roll 111 for the purpose presently described. In Fig. 7 the door or presser is shown as closed in against a folded blank on the former 36, but the said door or presser, when free to do so, is held slightly away from the side of the former, this normal tendency being due to a spring 112 mounted in a socket in the bearing block 109 and bearing against the outer face of the base 33. The limit of outward movement of the door or presser is determined by a lug 113 adapted to contact with the edge of the base 33. The rod or stem 110 is adapted to slide in its bearing in block 109, within the limits prescribed by a nut and washer 114 secured to the end of stem 110 and a shoulder 115 near the other end. The reason for this sliding movement will be explained hereinafter. The sleeve bearing 109 is formed with an elongated opening or slot 116 in which a lever 117 having a weight 118 is pivoted at 119. The inner end of the lever 117 is cam shaped and between it and the surface of the stem 110 is interposed a friction block or brake 120. A spring 121 connects the weighted lever 117 with a portion of the bearing 109. The purpose of the sliding mounting of the pivoted door or presser will be presently explained.

During the time that the flaps 1 and 2 are being folded the doors or pressers 65 are not only swung somewhat downward from the formers, but they are also in a position below the plane of the sides of the formers as shown in Fig. 5. They must then be moved upward and closed inward to fold and hold the flaps 3. This movement is effected by cam tracks 122, the horizontal edges of which engage the rolls 111 to cause the stems 110 to slide in their bearings, and the vertical faces of which engage rolls 123 mounted on said stems to force the presser against the sides of the blank on the former, (see Fig. 4.) The cam tracks 122 are shown in Figs. 1, 1ª, 2, 4, 9 and 10. As shown in Fig. 2, the cam tracks 122 are vertically inclined at a point below the pads or fingers 53, this being the point of entrance for the carriers and their formers, the said cam tracks having also laterally inclined portions 124 near their entrace end as shown in Fig. 9. It will therefore be understood that as the rolls 111 and 123 of the doors or pressers engage the upper edge and inner faces of the cam tracks at the entrance end of the latter, the said tracks first cause the stems to slide upwardly in their bearings 109, rolls 111 riding up on the said inclined entrance ends of the cam tracks. This movement of course, causes the doors or pressers 64 to fold up the flaps 3 of the blank over and upon the flaps 2 and 1. Immediately after the doors or pressers have been so slid upward, the rolls 123 reach the converging inner faces 124 of the tracks (Fig. 9) and swing the pressers inward so as to clamp the flaps 3 firmly against the flaps 2 and 1. They remain in this position all the way around to a point underneath the portions of the machine shown in Figs. 1ª and 2, the cam tracks 122 having a space of uniform width between them and presenting their outer edges uniformly distant from the guides or channels 29 of the carriers all the way rearward and downward and underneath from the point of entrance just described to a point where the doors or pressers must be released to permit the completed boxes with their flaps folded to be discharged from the machine. This point of discharge is approximately the position of the one former mechanism shown in Fig. 2. When they have reached this position it is essential that the doors or pressers shall not only be released from their clamping position against the formers, but since they are then in the position the reverse of that shown in Fig. 7, they must then be positively slid upward in their bearings 109. In other words they must be lifted above the plane of the then position of the former 36 shown in Fig. 2, to a position along side of the bases 33. To do this positively, supplemental cam tracks 125 are provided, (see Figs. 2 and 10). And the cam tracks 122 diverge at this same location. When the rolls 123 of the pressers reach the diverging portions of the tracks, the pressers are permitted to open and the rolls 111 reach the inclined ends of the supplemental cam tracks 125 so as to slide the stems 110 upward. In order that the stems 110 shall not drop back after they leave the supplemental tracks 125, the friction blocks or brakes 120 are employed. As can be seen by inverting Fig. 7, when the carrier is at the discharge end, the gravity of the weight 118 will cause the cam shaped inner end of the lever 117 to bind the friction block 120 against the stem 110 so as to prevent it from sliding down after it has been lifted by track 125. At this time the doors or pressers are in the position relatively to the former as indicated in Fig. 5, and consequently out of the horizontal plane of the formers 36. But when the carrier moves on upward and takes a new blank and passes on to the entrance end of the machine, the stem is then inverted again and the weight 118 causes the lever 117 to release the friction block so that the stem 110 can then be positively lifted by the roll 111 riding up the inclined entrance end of the cam tracks.

The springs 121 are intended to somewhat countereffect any tendency of the weighted levers to shift too suddenly. It will now be understood that the doors or pressers 65, carried by the endless conveyer adjacent to the formers, act to fold outer portions of the box blanks against opposite sides of the formers, and since they move or travel with the formers, these folders and pressers act to hold the outer portions of the boxes under the continued pressure so as to insure the proper adhesion between the opposite side folds or flaps of the box.

Having now described the mechanism for causing the doors or pressers to clamp and hold the blanks and formers and to then release them, I shall next describe the means which discharges each completed box from its former as the latter reaches the position shown in Fig. 2. The wipers or knockers-off comprise yieldingly mounted plates 130 which are preferably faced with leather or rubber or some other soft material 131, said wipers being mounted to rotate in the direction of the arrows in Fig. 11 so that they will engage the sides of a completed box as a former passes between them, and eject said box from the former and throw it off so that it may drop into any suitable receptacle, not shown. It is to be understood, of course, that the wipers have a speed or rotation faster than the speed of travel of the endless series of carriers and formers.

As shown in Figs. 1 and 2, a bracket 132, is mounted on the base 20 of the machine, said bracket having an upright face or wall which is preferably cut away at the center. Said bracket is formed with horizontal ways 133 each side of the cut away portion and also provided with horizontal slots 134. Two castings 135 are adjustably secured to the bracket 132 by means of bolts or screws 136 passing through the slots 134. A right and left hand threaded screw 137 having a hand wheel 138 connects the two castings 135 so that the latter may be conveniently adjusted toward and from each other to cause the wipers to properly engage the sides of the boxes being formed in the machine. Each casting 135 has an arm 139 the upper end of which is provided with a bearing, slightly inclined from the vertical, for a shaft 140, said shaft having a beveled pinion 141 at its lower end, which pinion meshes with a beveled face gear 142 carried by a shaft 143.

As shown in Figs. 2 and 3, the parts so far described are so arranged relatively to each other that rotation of the shaft 143 will cause the two wiper shafts 140 to revolve in opposite directions. Secured to the upper end of each shaft 140 is a block 144 (see Fig. 12), said block having a socket or recess 145. A spindle 146 is mounted in said socket and is provided with a pin 147 projecting into a guide slot 148 in the wall of the socket or recess so that said spindle cannot rotate in said socket although permitted to have a sliding longitudinal movement therein. The reduced end of the spindle passes through the base of the socket and is provided with nuts 149 and preferably also an elastic washer 150 between said nuts and the adjacent face of the block 144. The other or projecting larger end of the spindle 146 is provided with a yoke or divided head 151, said head supporting a pivot 152, on which pivot ears 153 of the plate 130 are pivoted. A spring 154 is mounted on the pivot 152 and has its ends bearing relatively against a portion of the spindle head and the rear of the plate 130 so that the wiper will normally occupy a position, relatively to the spindle, as indicated in Figs. 3, 11 and 12. The springs 154 cause the edge portions of the wipers instead of the central portions, to yieldingly engage the sides of the box on the former. Springs 155, one in each socket 145, permit the spindles and the wipers to yield bodily in a direction away from the boxes on the formers. The two springs 154 and 155 of each wiper cause the latter to engage the box with great delicacy and yet cause the wipers to properly operate on the boxes without fail.

The shaft 143 which rotates the wipers is mounted in bearings 156 (see Fig. 3) and is provided at one end with a pinion 157 meshing with a gear 158 carried by a stud shaft 159 mounted in one of the uprights 21. The other end of the stud shaft is provided with a sprocket 160 driven by means of a chain 161, the latter being actuated by a sprocket wheel 162 on the shaft 22. It will now be understood that, through the connections described, the wipers will be rotated in the direction of the arrows in Fig. 11, so that they will engage and push off the boxes as the formers pass between them.

As has been mentioned, all of the parts of this machine are adjustable to permit it to be adapted to operate on blanks of different sizes, different sized formers being, of course, substituted or interchanged to suit the different sizes of blanks used. When adjustments are made, it is desirable that the cam tracks 122 be simultaneously and equally moved toward and from each other throughout all portions of their length in order that their parallelism throughout be constant.

Referring to Figs. 1, 1ª, 2 and 4, it will be seen that the upper and lower horizontal portions of the frame have secured thereto brackets 170 in each of which is mounted a guide rod 171 and a right and left hand threaded shaft 172. Mounted on each of said rods and shafts as shown in Fig. 4, are two castings 173 which are in practice internally threaded to engage the screw threads of the shaft 172, and smooth where mounted on the rod 171. The cam tracks 122 are secured as by screws 174 to the said casting 173. There are as many pairs of castings 173 and corresponding rods 171 and shafts 172 as are necessary to support the cam tracks at the necessary intervals. As indicated in Figs. 1 and 1ª there may be only two upper and two lower pairs of these supports, but as many may be employed and at such intervals as necessary. Each shaft 172 is provided at one end with a beveled gear 175. By means of suitable shaftings 176 and beveled pinions 177, all of the adjusting shafts 172 are actuated in unison. As shown in Fig. 1ª, the vertical shaft 176 is provided about mid way of its length with a beveled gear 178 which meshes with a similar gear 179 on a shaft 180, the latter extending to the rear of the machine as indicated in Fig. 1 where it is readily accessible to be rotated by means of any suitable mechanism. Preferably at the said rear of the machine, there is another rod 171 and shaft 172 and gearing similar to what is shown at the top of Fig. 4, in order to insure proper adjustment of the relative positions of the cam tracks 122 at their curved rear portions.

As has been explained, the two rods 59 and 60 are right and left screw threaded as indicated in Figs. 3 and 14. They are geared together by a suitable train of pinions 181 so that a crank handle 182 applied to one of said rods and actuated, will rotate both of said rods simultaneously and in the same direction. Since the block frames 65 are mounted on said rods 59 and 60, and since they are of course internally threaded to properly engage the threaded portions of said rods, the operation of the handle 182 will cause an accurate and simultaneous adjustment of the frames 65 and castings 66 toward and from each other so that the folders 62 and 63 which are carried by said blocks 65 will properly engage and fold the flaps 1 and 2 of the blanks. Since the other folders or doors or pressers 64 are mounted on the traveling carriers, they could not be connected so that they could all be simultaneously adjusted toward and from each other without the employment of rather complicated mechanism. In the machine as illustrated in the drawings, the two members of each base 33 of a carrier are properly adjusted by hand upon the rods 26, and this adjustment of the two base members causes also a proper adjustment of the doors or side pressers because the latter are, as shown in Fig. 7, connected with and supported by the said base members 33.

Having thus explained the nature of the invention, and described a way of constructing and using the same, although without attempting to set forth all of the forms in which it may be made, or all of the modes of its use, I declare that what I claim is:—

1. A box making machine comprising an endless series of flexibly connected carriers, each having a clamping face, and a former movable toward and from said face to clamp a portion of a blank, means for folding another portion of the blank over the top of the former, flap folders between which the formers travel, and flap folders and pressers supported by the carriers and traveling therewith to retain the flaps in folded condition as they pass through the machine.

2. A box making machine comprising an endless series of flexibly connected carriers, each having a clamping face, and a former movable toward and from said face to clamp a portion of a blank, means for folding another portion of the blank over the top of the former, flap folders between which the formers travel, and flap folders and pressers supported by the carriers and traveling therewith to retain the flaps in folded condition as they pass through the machine, the clamping face of each carrier being composed of two members adjustable relatively to each other, and the formers being removable from the carriers, to enable the machine to be used for different sizes of blanks.

3. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and stationary cam tracks mounted within the space inside the path of travel of the carriers to control the movements of the formers relatively to the carrier faces.

4. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, stationary cam tracks mounted within the space inside the path of travel of the carriers to control the movements of the formers relatively to the carrier faces, and stationary cam tracks outside the path of movement of the carriers to control the movements of the traveling pressers.

5. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, stationary cam tracks mounted within the space inside the path of travel of the carriers to control the movements of the formers relatively to the carrier faces, and stationary cam tracks outside the path of movement of the carriers to control the movements of the traveling pressers, means being provided for adjusting said cam tracks toward and from each other.

6. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and means for automatically discharging the completed boxes from the formers while the latter are moving.

7. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, means for automatically discharging the completed boxes from the formers while the latter are moving, and means for separating the traveling flap pressers from the formers just before they reach the discharging means.

8. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and rotary wipers between which the formers pass, said wipers rotating with a greater speed than the speed of travel of the formers to discharge completed boxes from the formers during the travel of the latter.

9. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and rotary wipers mounted on opposite sides of the path of movement of the formers to eject the finished boxes therefrom, said wipers being yieldingly mounted.

10. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and rotary wipers mounted on opposite sides of the path of movement of the formers to eject the finished boxes therefrom, said wipers being yieldingly mounted, means being provided for adjusting the wipers toward and from each other.

11. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and a gage to otherwise determine the location of a box blank supplied to each former.

12. A box making machine comprising an endless series of flexibly connected carriers each having a clamping face and a former movable toward and from said face to clamp a portion of a blank, means for bending blanks over the ends of the formers, a series of yielding pads or fingers past which the formers move, said pads or fingers holding each blank folded over the end of its former, devices for folding the flaps of the blank against the sides of the former, and pressers movably connected with said carrier to travel therewith.

13. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and means for adjusting the normal positions of the folding devices relatively to the sides of the formers.

14. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, wheels supporting the ends of the series of carriers, and guide tracks between said wheels for the straight stretches of the series.

15. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and means for actuating the pressers to move them toward and from the formers, and also in a direction transverse thereof in a plane parallel with the sides of said formers.

16. A box making machine comprising an endless series of flexibly connected carriers each having a clamping face and a former movable toward and from said face to clamp a portion of a blank, non-traveling folders for turning blank flaps against the formers, a flap folder and presser connected with each carrier to travel therewith, and means for actuating the pressers to cause them to first move in a plane substantially parallel with the sides of the formers to fold the flaps of the blank and to then move inward toward the formers to grasp and hold said flaps.

17. A box making machine, comprising in its construction a continuously movable carrier, a former mounted thereon, devices for folding the flaps of the blank against the sides of the former during the travel of the latter, said devices including a pair of pressers mounted on the carrier and movable toward and from the sides of the former, means for causing said pressers to bear against and then release the flaps of a box blank on said former, and rotary wipers between which the former passes after the said pressers have released the box.

18. A box-making machine, comprising in its construction front and rear shafts, sprocket wheels mounted on said shafts, an endless series of connected carriers supported by said sprocket wheels, each carrier comprising two triangle-shaped end frames and rods connecting said end frames and carrying a rigid base, guides for the carriers between said sprocket wheels, means for driving one of said shafts, formers supported by said carriers, each of said formers being movable toward and from the rigid base of its carrier and means for folding the flaps or blanks about said formers, said means including pressers connected with the carriers to travel therewith.

19. A box making machine, comprising in its construction a continuously movable carrier, a base supported by said carrier, a former pivotally mounted on the carrier and movable toward and from said base to clamp a blank, an arm having two rolls, said arm being pivotally supported by said carrier, connections between said arm and the former to vibrate the latter, a cam track or guide coöperating with one of said rolls to close the former against the base, and a second cam track to coöperate with the other of said rolls positively separate the former from the base.

20. A box making machine, comprising in its construction a continuously movable carrier, a former mounted thereon, side flap folders between which the former travels, said side flap folders being jointed as well as pivoted, and having springs whereby they may have a yielding movement both vertically and inwardly relatively to the former.

21. A box-making machine comprising an endless series of flexibly connected carriers each having a rigid clamping face, and a former movable toward and from said face to clamp a portion of a blank, means for folding another portion of the blank over the top of the former, devices for folding two flaps of each blank downward, vertical shafts having folders for turning in the end flaps over the two flaps first turned downward, the said folders being located on opposite sides of the path of movement of the former and blank, and combined folders and pressers connected to the carriers to travel therewith.

22. A box-making machine comprising an endless series of flexibly connected carriers each having a rigid clamping face, and a former movable toward and from said face to clamp a portion of a blank, means for folding another portion of the blank over the top of the former, side flap folders mounted to slide past the sides of the formers and to also move toward and from said sides of the former, means for actuating said folders, and combined folders and pressers connected to said carriers to travel therewith.

23. A box making machine, comprising in its construction a continuously movable carrier, a former mounted thereon, bearings pivotally supported by the carrier on opposite sides of the former, folders having shanks mounted in said bearings, and means for swinging the bearings and sliding the shanks of the folders in said bearings.

In testimony whereof I have affixed my signature, in presence of two witnesses.

ELIE W. LABOMBARDE.

Witnesses:
C. F. Brown,
P. W. Pezzetti.